(12) United States Patent
Suzuki (10) Patent No.: US 11,098,807 B2
(45) Date of Patent: Aug. 24, 2021

(54) VALVE DEVICE

(71) Applicant: DENSO CORPORATION, Kariya (JP)

(72) Inventor: Takahito Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/895,379

(22) Filed: Jun. 8, 2020

(65) Prior Publication Data

US 2020/0393052 A1 Dec. 17, 2020

(30) Foreign Application Priority Data

Jun. 17, 2019 (JP) .............................. JP2019-112013

(51) Int. Cl.
*F16K 11/07* (2006.01)
*F16K 11/076* (2006.01)
*F16K 27/04* (2006.01)

(52) U.S. Cl.
CPC ............ *F16K 11/076* (2013.01); *F16K 27/04* (2013.01); *F16K 27/041* (2013.01); *Y10T 137/86855* (2015.04)

(58) Field of Classification Search
CPC . F16K 27/04; F16K 11/076; Y10T 137/86855
See application file for complete search history.

(56) References Cited

U.S. PATENT DOCUMENTS

| | | | |
|---|---|---|---|
| 2016/0010536 A1* | 1/2016 | Murakami | F16K 11/076 137/625.44 |
| 2016/0363036 A1 | 12/2016 | Imasaka | |
| 2018/0051815 A1* | 2/2018 | Murakami | F16K 11/076 |
| 2019/0003370 A1* | 1/2019 | Nomura | F01P 7/165 |
| 2019/0219179 A1* | 7/2019 | Sato | F16K 27/04 |
| 2020/0408311 A1* | 12/2020 | Hashimoto | F16K 11/076 |
| 2021/0080014 A1* | 3/2021 | Sato | F16K 27/041 |

FOREIGN PATENT DOCUMENTS

JP 2016-196931 11/2016

* cited by examiner

*Primary Examiner* — Kevin R Barss
(74) *Attorney, Agent, or Firm* — Nixon & Vanderhye P.C.

(57) ABSTRACT

In a valve device, a housing has a fluid inlet and a fluid outlet. A valve body is rotatably placed at an inside of the housing and has a flow inlet and a flow outlet. A sleeve is placed at the fluid outlet of the housing. A seat member is placed between the sleeve and an outer wall of the valve body and slidably contacts the outer wall of the valve body. The valve device is configured such that the fluid, which enters from the fluid inlet of the housing into the inside of the housing, flows from the flow inlet of the valve body toward the inside space of the valve body and is limited from flowing into a space formed between an inner wall of the housing and the outer wall of the valve body.

6 Claims, 11 Drawing Sheets

VALVE DEVICE

CROSS REFERENCE TO RELATED APPLICATIONS

This application is based on and incorporates herein by reference Japanese Patent Application No. 2019-112013 filed on Jun. 17, 2019.

TECHNICAL FIELD

The present disclosure relates to a valve device.

BACKGROUND

Previously, there is known a valve device that is configured to perform at least one of adjusting a flow rate of fluid and changing a flow passage of the fluid. One such a valve device includes: a housing that has a fluid inlet and a fluid outlet; and a valve body that is rotatably placed at an inside of the housing. When a foreign object is caught between an outer wall of the valve body and a seat member, the outer wall of the valve body or the seat member may possibly be damaged in response to rotation of the valve body to possibly cause leakage of fluid from the damaged portion.

SUMMARY

This section provides a general summary of the disclosure, and is not a comprehensive disclosure of its full scope or all of its features.

According to the present disclosure, there is provided a valve device that includes a housing, a valve body and a seat member. The valve body is rotatably placed at an inside of the housing and has a flow inlet, which is formed at a location that corresponds to a fluid inlet of the housing, and a flow outlet, which is formed at a location that corresponds to a fluid outlet of the housing. The seat member slidably contacts an outer wall of the valve body. The valve device is configured such that fluid, which enters from the fluid inlet of the housing into an inside of the housing, flows from the flow inlet of the valve body toward an inside space of the valve body and is limited from flowing into a space formed between an inner wall of the housing and the outer wall of the valve body.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Previously, there is known a valve device that is configured to perform at least one of adjusting a flow rate of fluid and changing a flow passage of the fluid.

One previously proposed valve device of this kind includes: a housing that has a fluid inlet and a fluid outlet; and a valve body that is rotatably placed at an inside of the housing. A sleeve, which is shaped in a tubular form, is placed at the fluid outlet of the housing. A seat member is placed between an end portion of the sleeve and an outer wall of the valve body. The seat member has a sealing function for limiting leakage of the fluid (flow of the fluid) between: a space, which is formed between an inner wall of the housing and the outer wall of the valve body; and a flow passage located at an inside of the sleeve.

The valve device described above is used in a coolant circuit, in which coolant of an engine is circulated. The coolant, which is circulated in the coolant circuit, may possibly contain foreign objects, such as molding sand flowing out from the engine made by sand casting, and/or cutting debris flowing out from parts produced by a cutting process. Therefore, when such a foreign object is caught between the outer wall of the valve body and the seat member, the outer wall of the valve body or the seat member may possibly be damaged in response to rotation of the valve body, and thereby the coolant may possibly leak from the damaged portion. When the leakage amount of the coolant at the inside of the valve device increases, for example, the heated coolant, which is heated by the engine, flows to a radiator and is cooled at the radiator to possibly cause lengthening of a time period for warming up the engine and a transmission, and thereby deteriorating the fuel economy.

According to the present disclosure, there is provided a valve device that is configured to perform at least one of adjusting a flow rate of fluid and changing a flow passage of the fluid and includes a housing, a valve body, a sleeve and a seat member. The housing has a fluid inlet, through which the fluid enters the housing, and a fluid outlet, through which the fluid exits from the housing. The valve body is rotatably placed at an inside of the housing and has a flow inlet, which is formed at a location that corresponds to the fluid inlet, and a flow outlet, which is formed at a location that corresponds to the fluid outlet. The sleeve is placed at the fluid outlet of the housing and forms a flow passage, into which the fluid is outputted from an inside space of the valve body through the flow outlet. The seat member is placed between an outer wall of the valve body and an end portion of the sleeve located on a side where the valve body is placed while the seat member slidably contacts the outer wall of the valve body. The valve device is configured such that the fluid, which enters from the fluid inlet of the housing into the inside of the housing, flows from the flow inlet of the valve body toward the inside space of the valve body and is limited from flowing into a space formed between an inner wall of the housing and the outer wall of the valve body.

With the above structure, the foreign object, which is mixed in the fluid that enters from the fluid inlet of the housing into the inside of the housing, flows from the flow inlet of the valve body toward the inside space of the valve body, so that it is possible to limit the intrusion of the foreign object into the space formed between the inner wall of the housing and the outer wall of the valve body. Therefore, the capturing of the foreign object between the outer wall of the valve body and the seat member is limited, and thereby the damaging of the outer wall of the valve body and the seat member can be limited. Thus, the valve device of the present disclosure can limit an increase in the leakage of the coolant at the location between the outer wall of the valve body and the seat member.

Hereinafter, various embodiments of the present disclosure will be described with reference to the drawings. In the following embodiments, portions, which are the same or equivalent to each other, are indicated by the same reference signs, and description thereof is omitted.

First Embodiment

A first embodiment will be described with reference to the drawings. A valve device 1 of the present embodiment is used at a coolant circuit of an internal combustion engine installed to a vehicle. The valve device 1 is configured to perform adjusting a flow rate of coolant, which is circulated in the coolant circuit as the fluid, and changing a flow passage of the coolant. For example, a long life coolant (LLC), which contains ethylene glycol or the like, is used as the coolant.

Figure 1A:
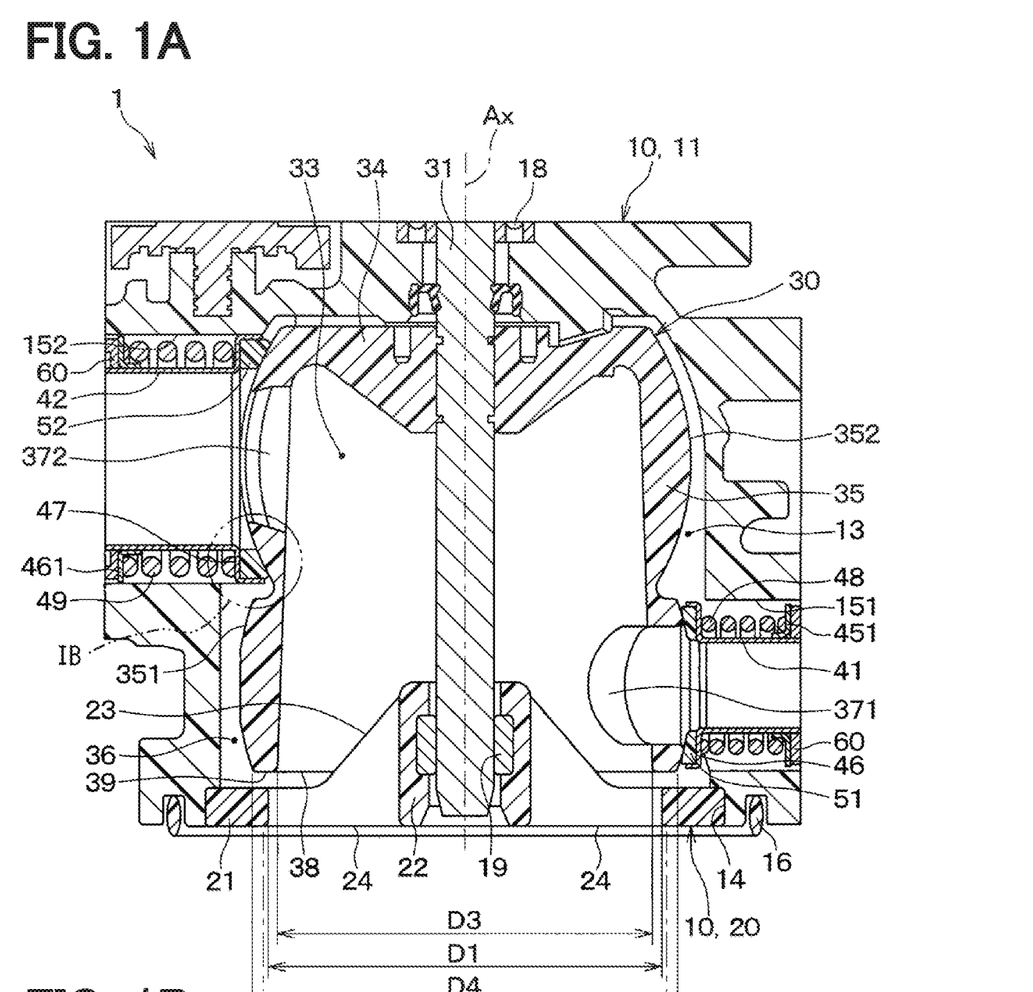
FIG. 1A is a cross-sectional view of a valve device according to a first embodiment.

As shown in FIG. 1A, the valve device 1 includes a housing 10, a valve body 30, sleeves 41, 42 and seat members 51, 52.

The housing 10 forms an outer shell of the valve device 1 and includes a housing main body 11 and an inlet member 20. A receiving space 13, which receives the valve body 30, is formed at an inside of the housing main body 11. The housing main body 11 has an opening 14, through which the receiving space 13 opens to an outside of the housing main body 11. The inlet member 20 is securely press fitted to an inner wall of the opening 14 of the housing main body 11. Furthermore, the housing main body 11 has fluid outlets 151, 152, which are communicated with the receiving space 13. Each of the sleeves 41, 42 and each of the seat members 51, 52 are installed to a corresponding one of the fluid outlets 151, 152.

Figure 2:
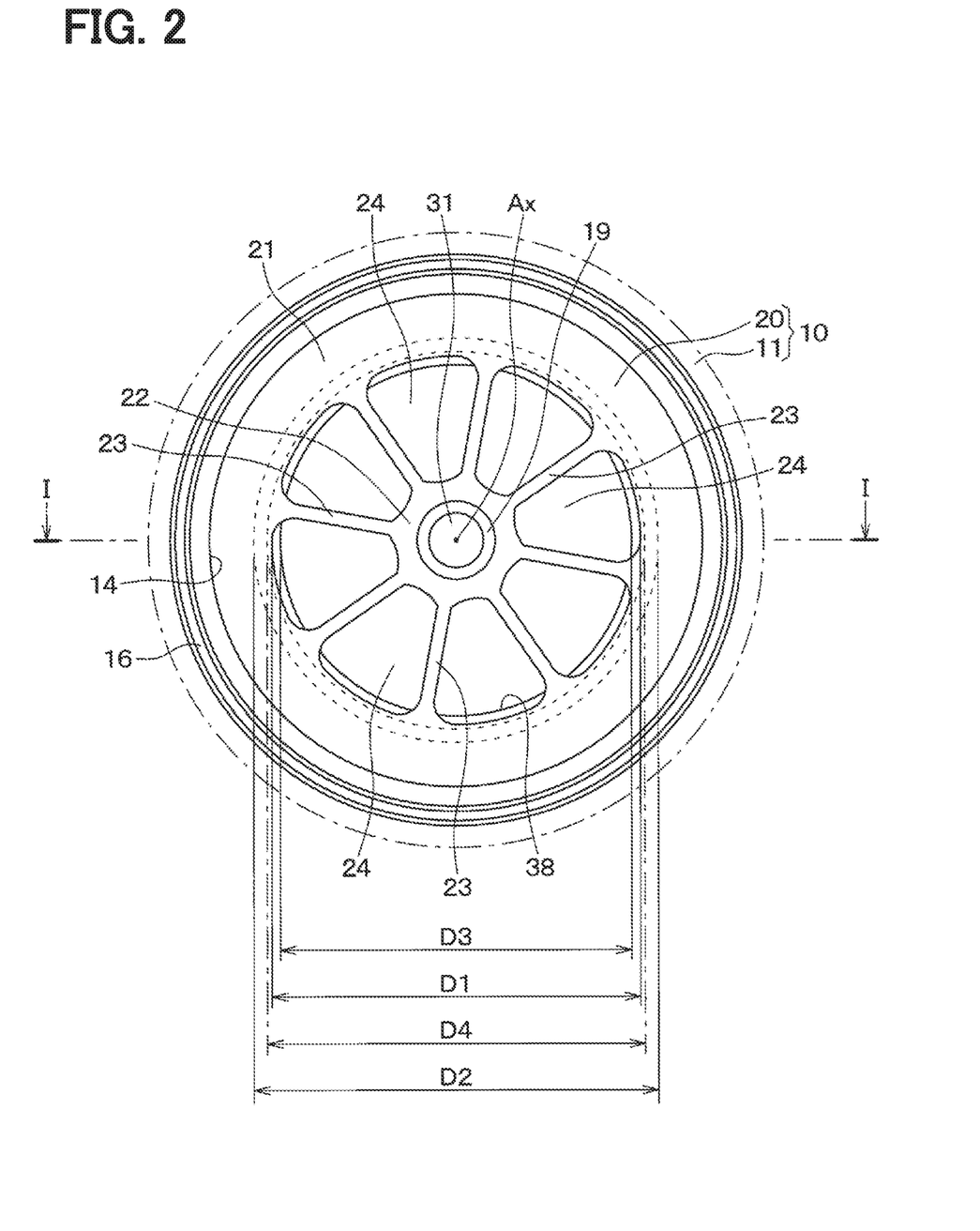
FIG. 2 is view taken in a direction of an arrow II in FIG. 1A.

As shown in FIGS. 1A and 2, the inlet member 20 is shaped generally in a circular disk form and has a ring portion 21, a center portion 22, a plurality of connecting portions 23 and a fluid inlet 24. The ring portion 21 is shaped in a ring form, and an outer wall of the ring portion 21, which is located at a radially outer side of the ring portion 21, is securely press fitted to the inner wall of the opening 14 of the housing main body 11. A bearing (referred to as a second bearing) 19, which rotatably supports a shaft 31 of the valve body 30, is installed to the center portion 22. The connecting portions 23 are radiated between the ring portion 21 and the center portion 22 and join between the ring portion 21 and the center portion 22. The fluid inlet 24 is a flow inlet of the coolant formed by the ring portion 21, the center portion 22 and the connecting portions 23. The coolant, which is circulated in the coolant circuit, flows into the inside of the housing 10 through the fluid inlet 24.

An O-ring 16 is installed to the housing main body 11 at a location that is on a radially outer side of the fluid inlet 24.

As shown in FIG. 1A, the valve body 30 is a so-called ball valve received at the inside of the housing main body 11. The valve body 30 is shaped in a bottomed tubular form and has a bottom portion 34 and a tubular portion 35 while the tubular portion 35 is shaped in a tubular form and extends from an outer periphery of the bottom portion 34 in the axial direction. The shaft 31 is fixed to a center of the bottom portion 34. One end portion of the shaft 31 is rotatably supported by a first bearing 18 installed to the housing main body 11, and the other end portion of the shaft 31 is rotatably supported by the second bearing 19 installed to the center portion 22 of the inlet member 20. Therefore, the valve body 30 is rotatable together with the shaft 31 at the inside of the housing 10.

The shaft 31 is rotated about a rotational axis thereof by an electric motor (not shown) that is placed at the outside of the housing main body 11. The valve body 30 is rotated about the axis of the shaft 31 at the inside of the housing 10 in response to the rotation of the shaft 31. The rotational axis of the shaft 31 coincides with the rotational axis Ax of the valve body 30.

An outer wall of the tubular portion 35 of the valve body 30 forms spherical surfaces 351, 352. Each of the spherical surfaces 351, 352 has a flow outlet 371, 372, through which the coolant exits from the valve body 30. In the present embodiment, a center of a sphere of the spherical surface 351 is different from a center of a sphere of the spherical surface 352, and these two spherical surfaces 351, 352 are formed at the outer wall of the tubular portion 35 of the valve body 30 while the flow outlets 371, 372 are formed at these two spherical surfaces 351, 352, respectively.

The fluid outlets 151, 152 of the housing main body 11 are respectively formed at the locations that respectively correspond to the flow outlets 371, 372 of the valve body 30. Specifically, each of the fluid outlets 151, 152 of the housing main body 11 is placed on an outer side of the corresponding one of the flow outlets 371, 372 of the valve body 30 in a direction that is perpendicular to the rotational axis Ax of the valve body 30. Each of the sleeves 41, 42 and each of the seat members 51, 52 are installed at an inside of a corresponding one of the fluid outlets 151, 152 of the housing main body 11. Each sleeve 41, 42 is a tubular member and is slidably supported by an inner wall of a corresponding one of fluid outlet holes (not shown) of an outlet pipe forming member 60 that is installed to the housing main body 11. Each sleeve 41, 42 forms a flow passage, into which the coolant is outputted from an inside space 33 of the valve body 30 through a corresponding one of the flow outlets 371, 372. Each sleeve 41, 42 has a flange 46, 47 at an end portion of the sleeve 41, 42 located on the valve body 30 side to support the corresponding seat member 51, 52.

Each seat member 51, 52 is placed between the flange 46, 47 of the corresponding sleeve 41, 42 and an outer wall of the tubular portion 35 of the valve body 30. Each seat member 51, 52 is shaped in a ring form and slidably contacts the outer wall of the tubular portion 35 of the valve body 30. Each of springs 48, 49 and each of support members 451, 461 are installed between the flange 46, 47 of the corresponding sleeve 41, 42 and the outlet pipe forming member 60, and each support member 451, 461 supports the corresponding spring 48, 49. The spring 48, 49 is a compression coil spring and urges the corresponding sleeve 41, 42 and the corresponding seat member 51, 52 toward the valve body 30. In this way, each seat member 51, 52 closely contacts the outer wall of the tubular portion 35 of the valve body 30. Each seat member 51, 52 limits leakage of the coolant (flow of the coolant) between: a space 36, which is formed between the inner wall of the housing 10 and the outer wall of the valve body 30; and the flow passage at the inside of the corresponding sleeve 41, 42. In the following discussion, the space 36, which is formed between the inner wall of the housing 10 and the outer wall of the valve body 30, will be referred to as a valve outside space 36.

Each seat member 51, 52 is urged against the valve body 30 by a pressure of the coolant in addition to the urging force of the corresponding spring 48, 49. Therefore, the force, which urges the seat member 51, 52 against the valve body 30, changes in response to a change in the pressure of the coolant that flows into the inside of the housing 10. When the force, which urges the seat member 51, 52 against the valve body 30, is increased, a frictional force between the seat member 51, 52 and the valve body 30 is increased. Therefore, in such a case, smooth rotation of the valve body 30 may possibly be interfered.

Figure 1B:
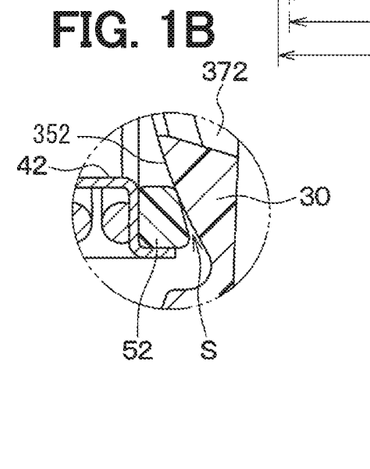
FIG. 1B is a partial enlarged view of an area IB in FIG. 1A.

In view of the above point, as indicated in FIG. 1B, which shows an enlarged view of an area IB of FIG. 1A, it is preferred that a minute gap S is formed between a radially outer side portion of the valve body 30 side surface of each seat member 51, 52 and the outer wall of the valve body 30. In this way, a portion of the pressure of the coolant applied to an opposite side surface of the seat member 51, 52, which is opposite to the valve body 30, is canceled by the pressure of the coolant applied to the valve body 30 side surface of the seat member 51, 52. As a result, even when the pressure of the coolant, which flows into the inside of the housing 10, changes, a change in the force, which urges the seat member 51, 52 against the valve body 30, is limited. Thus, the rotation of the valve body 30 is smoothened at the valve device 1.

FIG. 1A indicates a state where the position of each sleeve 41, 42 and the corresponding seat member 51, 52 installed to the corresponding fluid outlet 151, 152 of the housing main body 11 overlaps with the position of the corresponding flow outlet 371, 372 of the valve body 30. Therefore, the flow passage at the inside of the sleeve 41, 42 is communicated with the inside space 33 of the valve body 30 through the corresponding flow outlet 371, 372 of the valve body 30. In this state, the coolant can flow from the inside space 33 of the valve body 30 to the flow passage at the inside of each sleeve 41, 42 through the corresponding flow outlet 371, 372.

In contrast, although not depicted in the drawings, when the valve body 30 is rotated about the rotational axis of the shaft 31 from the position of the valve body 30 shown in FIG. 1A, there is a state where the position of each sleeve 41, 42 and the corresponding seat member 51, 52 installed to the corresponding fluid outlet 151, 152 of the housing main body 11 overlaps with the outer wall of the tubular portion 35 of the valve body 30. In this state, the flow of the coolant between the inside space 33 of the valve body 30 and the flow passage at the inside of each sleeve 41, 42 is blocked by the tubular portion 35 of the valve body 30.

A flow inlet 38, through which the coolant enters the inside space 33 of the valve body 30, is formed at the end portion of the valve body 30, which is opposite to the bottom portion 34. Specifically, the flow inlet 38 of the valve body 30 is located at one side in the axial direction of the rotational axis Ax of the valve body 30. Furthermore, the fluid inlet 24 of the inlet member 20 of the housing 10 is also located at the one side in the axial direction of the rotational axis Ax of the valve body 30. Therefore, in the present embodiment, the fluid inlet 24 of the housing 10 and the flow inlet 38 of the valve body 30 are placed at the position where the fluid inlet 24 of the housing 10 and the flow inlet 38 of the valve body 30 are opposed to each other. Furthermore, the fluid inlet 24 of the housing 10 and the flow inlet 38 of the valve body 30 are communicated with each other. Therefore, the coolant, which enters from the fluid inlet 24 of the housing 10 into the inside of the housing 10, flows into the inside space 33 of the valve body 30 through the flow inlet 38 of the valve body 30.

A predetermined gap is formed between the inlet member 20 of the housing 10 and an end portion 39 (hereinafter referred to as a flow inlet 38 side end portion 39) of the valve body 30 located on the side (the flow inlet 38 side) where the flow inlet 38 is placed. Therefore, the valve outside space 36 is kept in the state where the valve outside space 36 is filled with the coolant.

The coolant, which is circulated in the engine coolant circuit where the valve device 1 is used, may possibly contain foreign objects, such as molding sand flowing out from the engine made by sand casting, and/or cutting debris flowing out from parts produced by a cutting process. Therefore, when the foreign object is caught between the outer wall of the tubular portion 35 of the valve body 30 and the seat member 51, 52, the outer wall of the valve body 30 or the seat member 51, 52 may possibly be damaged in response to rotation of the valve body 30, and thereby the coolant may possibly leak from the damaged portion. When the leakage amount of the coolant at the inside of the valve device 1 increases, for example, the heated coolant, which is heated by the engine, flows to a radiator and is cooled at the radiator to possibly cause lengthening of a time period for warming up the engine and a transmission, and thereby deteriorating fuel economy.

Figure 3:
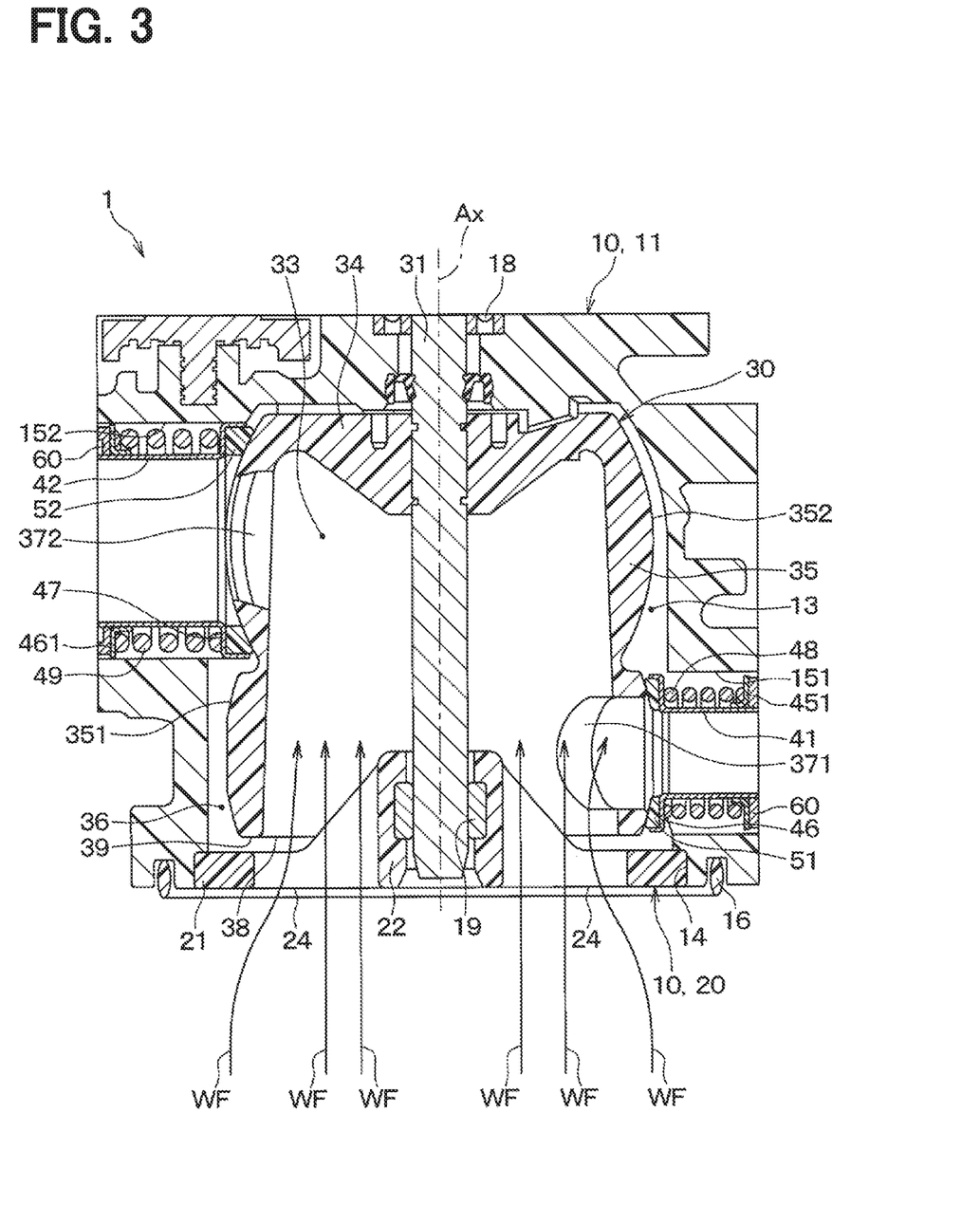
FIG. 3 is a diagram showing a flow of a coolant at the valve device according to the first embodiment.

In view of the above point, according to the present embodiment, the inner diameter D1 of the fluid inlet 24 of the housing 10 is set to be smaller than the outer diameter D2 of the flow inlet 38 side end portion 39 of the valve body 30. Thereby, as indicated by arrows WF in FIG. 3, the coolant, which enters from the fluid inlet 24 of the housing 10 into the inside of the housing 10, flows from the flow inlet 38 of the valve body 30 toward the inside space 33 of the valve body 30 and is limited from flowing into the valve outside space 36. Thereby, the foreign object mixed in the coolant, which enters from the fluid inlet 24 of the housing 10 into the inside of the housing 10, flows along with the flow of the coolant from the flow inlet 38 of the valve body 30 toward the inside space 33 of the valve body 30 and is limited from flowing into the valve outside space 36. Therefore, the capturing of the foreign object between the outer wall of the valve body 30 and the seat member 51, 52 is limited, and thereby the damaging of the outer wall of the valve body 30 and the seat member 51, 52 can be limited. Thus, the valve device 1 can limit an increase in the leakage of the coolant at the location between the outer wall of the valve body 30 and the seat member 51, 52.

Furthermore, as shown in FIGS. 1A and 2, in the present embodiment, an inner diameter D1 of the fluid inlet 24 of the housing 10 is set to be larger than an inner diameter D3 of the flow inlet 38 side end portion 39 of the valve body 30. In this way, it is possible to limit an increase in the pressure loss of the coolant that flows from the fluid inlet 24 of the housing 10 into the inside space 33 of the valve body 30.

In FIGS. 1A and 2, a center location, which is centered between the outer diameter D2 and the inner diameter D3 of the flow inlet 38 side end portion 39 of the valve body 30, is indicated by a dot-dash line. In the present embodiment, the inner diameter D1 of the fluid inlet 24 of the housing 10 is set to be smaller than a diameter D4 of the center location of the flow inlet 38 side end portion 39 of the valve body 30 and larger than the inner diameter D3 of the flow inlet 38 side end portion 39 of the valve body 30. Thereby, the coolant, which enters from the fluid inlet 24 of the housing 10 into the inside of the housing 10, can be more reliably guided to the inside space 33 of the valve body 30 and can be limited from flowing into the valve outside space 36.

Furthermore, although note depicted in the drawings, the inner diameter D1 of the fluid inlet 24 of the housing 10 may be set to be larger than the diameter D4 of the center location of the flow inlet 38 side end portion 39 of the valve body 30 and smaller than the outer diameter D2 of the flow inlet 38 side end portion 39 of the valve body 30. In this way, the coolant, which enters from the fluid inlet 24 of the housing 10 into the inside of the housing 10, can be guided toward the inside space 33 of the valve body 30 while limiting an increase in the pressure loss of the coolant.

Now, a valve device 100 of a comparative example will be described in comparison with the valve device 1 of the first embodiment described above.

Figure 10:
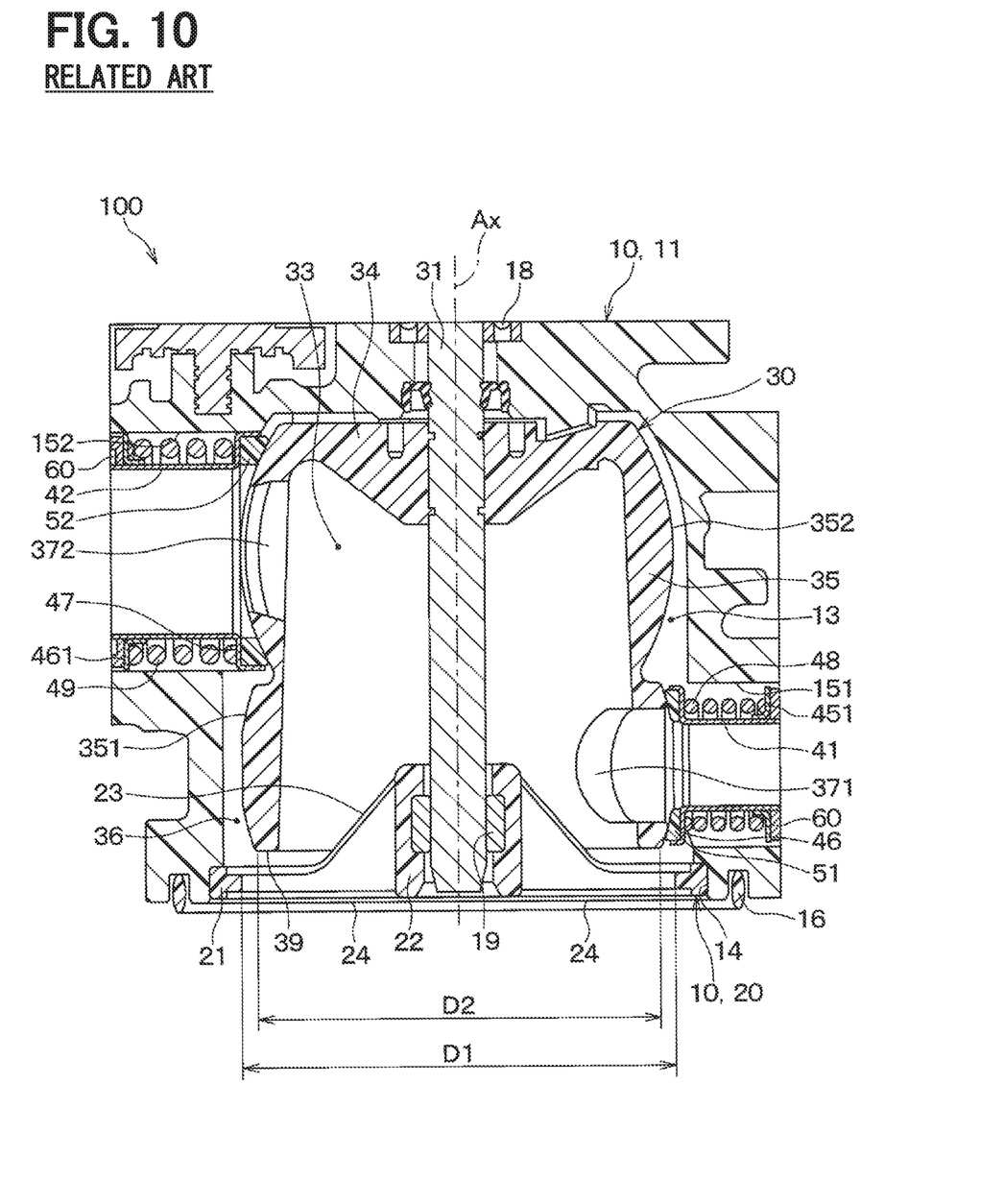
FIG. 10 is a cross-sectional view of a valve device according to a comparative example.
Figure 11:
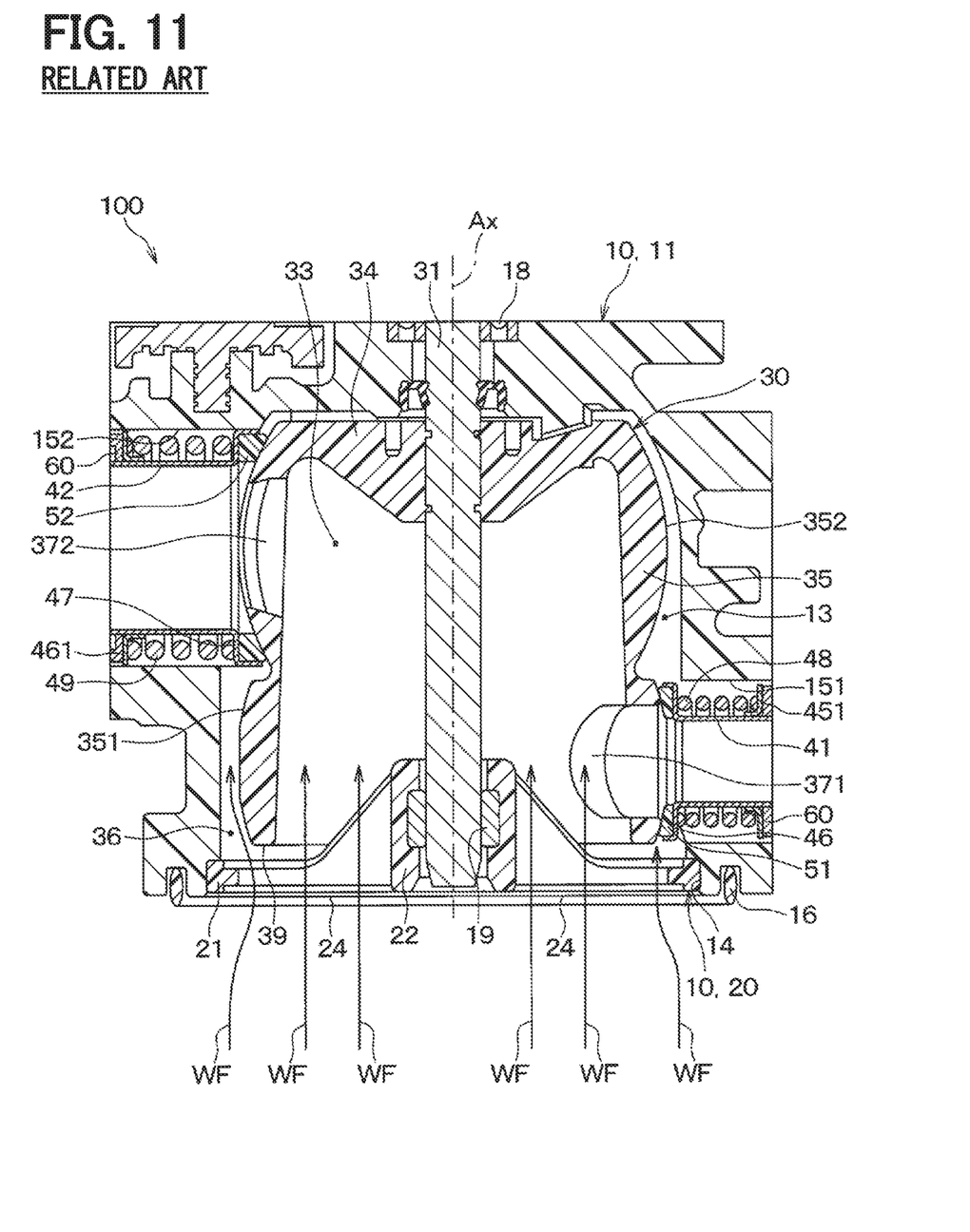
FIG. 11 is a diagram showing a flow of a coolant of the valve device of the comparative example.

As shown in FIG. 10, in the valve device 100 of the comparative example, the inner diameter D1 of the fluid inlet 24 of the housing 10 is larger than the outer diameter D2 of the flow inlet 38 side end portion 39 of the valve body 30. With this structure, as indicated by arrows WF in FIG. 11, a portion of the coolant, which enters from the fluid inlet 24 of the housing 10 into the inside of the housing 10, flows toward the valve outside space 36. Therefore, some of the foreign objects, which are mixed in the coolant that flows from the fluid inlet 24 of the housing 10 into the inside of the housing 10, intrude into the valve outside space 36. Thus, the foreign object may possibly be caught between the outer wall of the valve body 30 and the seat member 51, 52, and the outer wall of the valve body 30 and the seat member 51, 52 may possibly be damaged by the foreign object when the valve body 30 is rotated in this state where the foreign object is caught between the outer wall of the valve body 30 and the seat member 51, 52. As a result, in the valve device 100 of the comparative example, there is a concern that leakage of the coolant increases at the location between the flow passage at the inside of the sleeve 41, 42 and the valve outside space 36.

Unlike the valve device 100 of the comparative example, the valve device 1 of the present embodiment provides the following advantages.

(1) In the present embodiment, the inner diameter D1 of the fluid inlet 24 of the housing 10 is set to be smaller than the outer diameter D2 of the flow inlet 38 side end portion 39 of the valve body 30. Thereby, the coolant, which enters from the fluid inlet 24 of the housing 10 into the inside of the housing 10, flows from the flow inlet 38 of the valve body 30 toward the inside space 33 of the valve body 30 and is limited from flowing into the valve outside space 36. Thus, the foreign object, which is mixed in the coolant, also flows from the flow inlet 38 of the valve body 30 into the inside space 33 of the valve body 30 along with the coolant, so that the intrusion of the foreign object into the valve outside space 36 can be limited. Therefore, the capturing of the foreign object between the outer wall of the valve body 30 and the seat member 51, 52 is limited, and thereby the damaging of the outer wall of the valve body 30 and the seat member 51, 52 can be limited. Thus, the valve device 1 can limit an increase in the leakage of the coolant at the location between the outer wall of the valve body 30 and the seat member 51, 52.

(2) In the present embodiment, the inner diameter D1 of the fluid inlet 24 of the housing 10 is set to be smaller than the outer diameter D2 of the flow inlet 38 side end portion 39 of the valve body 30 and is larger than the inner diameter D3 of the flow inlet 38 side end portion 39 of the valve body 30. In this way, it is possible to limit an increase in the pressure loss of the coolant that flows from the fluid inlet 24 of the housing 10 into the flow inlet 38 of the valve body 30.

Second Embodiment

A second embodiment will be hereinafter described. The second embodiment is a modification of the first embodiment where the structure of the fluid inlet 24 of the housing 10 is changed from that of the first embodiment. Since the rest of the structure of the second embodiment is the same as that of the first embodiment, there will be only described the differences that are different from the first embodiment.

Figure 4:
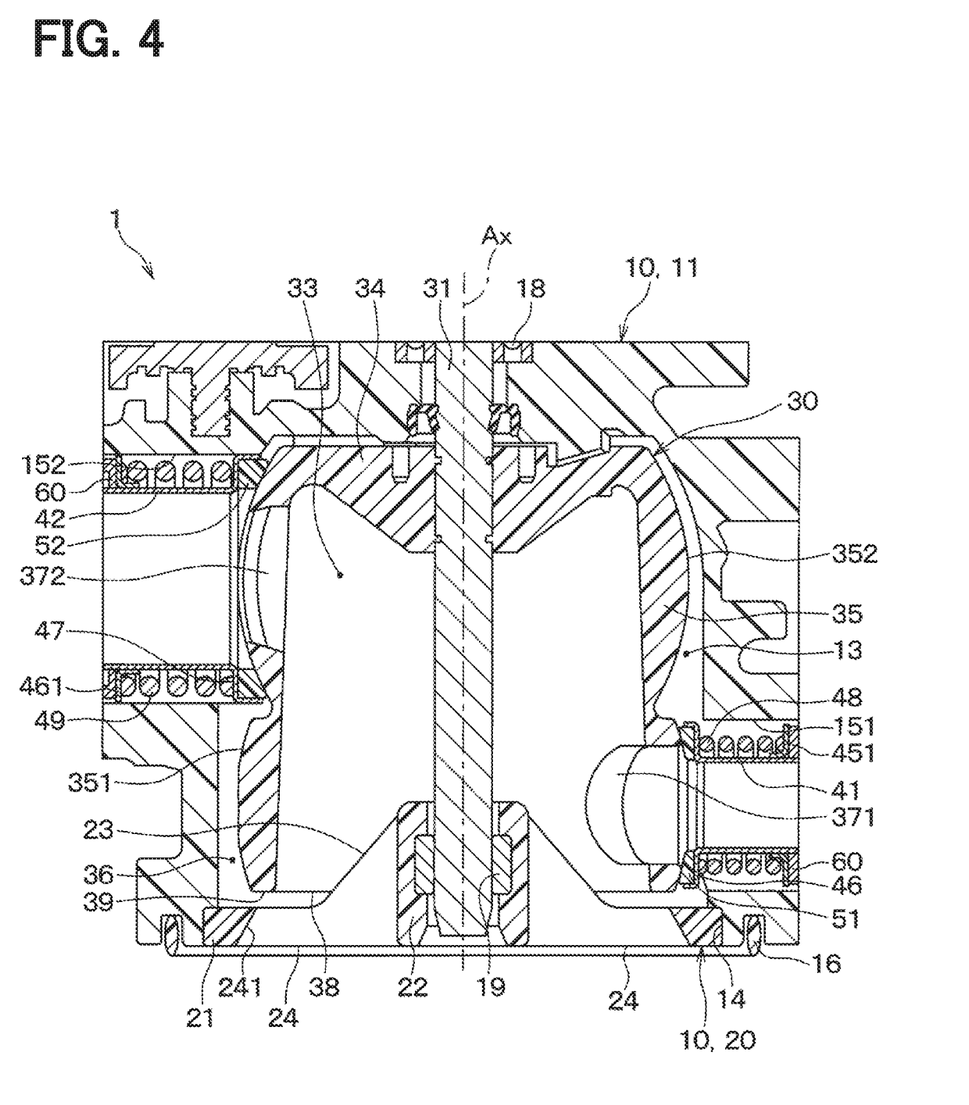
FIG. 4 is a cross-sectional view of a valve device according to a second embodiment.
Figure 5:
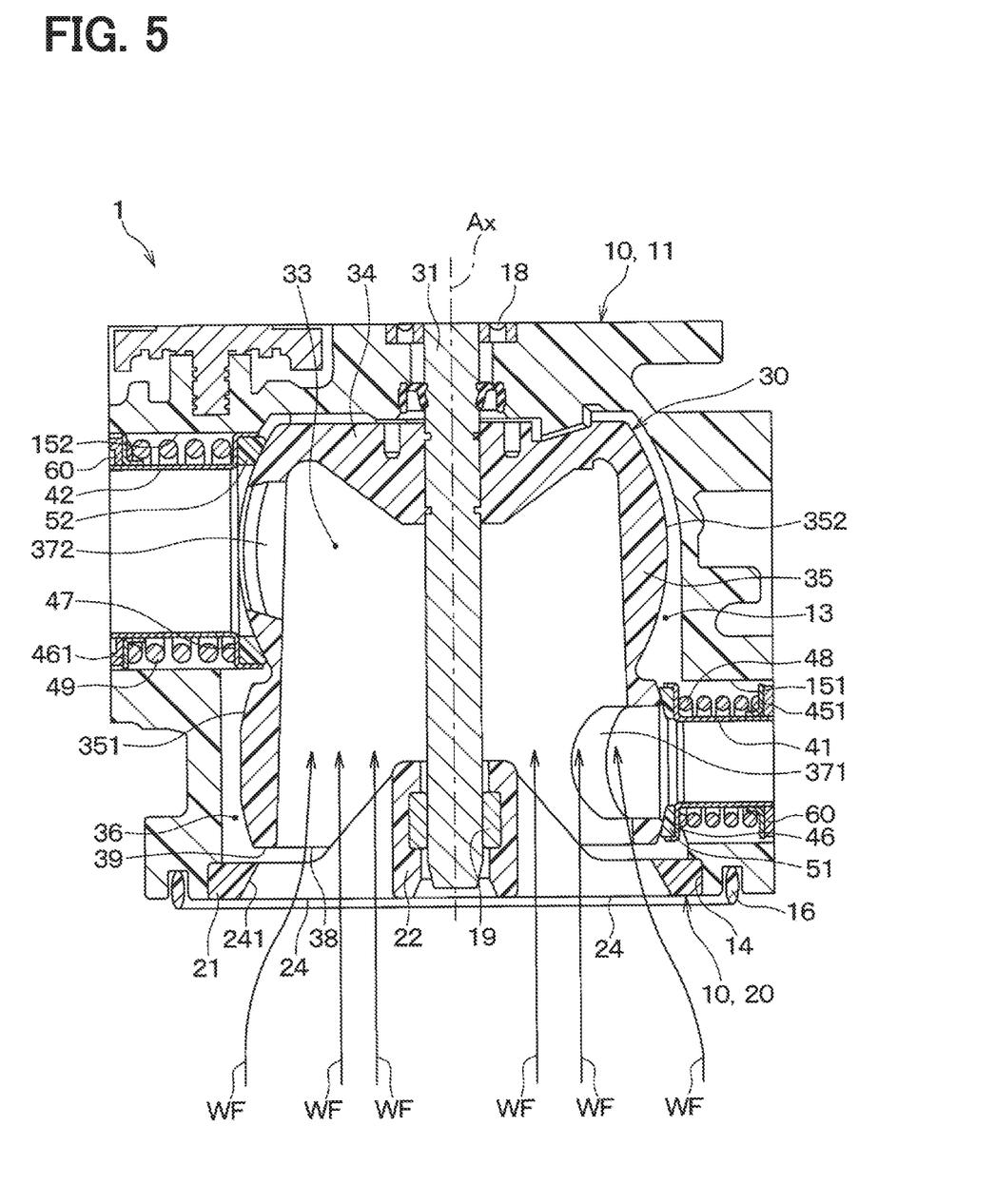
FIG. 5 is a diagram showing a flow of the coolant at the valve device according to the second embodiment.

As shown in FIG. 4, in the second embodiment, an inner wall 241 of the fluid inlet 24 of the housing 10 is shaped in a tapered form that has an inner diameter, which is progressively reduced from an opposite side, which is opposite to the flow inlet 38 of the valve body 30, toward the flow inlet 38. With this structure, as indicated by arrows WF in FIG. 5, the coolant, which enters from the fluid inlet 24 of the housing 10 into the inside of the housing 10, flows from the flow inlet 38 of the valve body 30 toward the inside space 33 of the valve body 30 and is limited from flowing into the valve outside space 36. Thereby, the foreign object mixed in the coolant, which enters from the fluid inlet 24 of the housing 10 into the inside of the housing 10, flows along with the flow of the coolant from the flow inlet 38 of the valve body 30 toward the inside space 33 of the valve body 30 and is thereby limited from flowing into the valve outside space 36. Therefore, even in the valve device 1 of the second embodiment, like the first embodiment, the capturing of the foreign object between the outer wall of the valve body 30 and the seat member 51, 52 is limited, and thereby an increase in the leakage of the coolant can be limited.

Furthermore, in the second embodiment, the inner wall 241 of the fluid inlet 24 of the housing 10 is shaped in the tapered form, so that an increase in the pressure loss of the coolant, which flows from the fluid inlet 24 of the housing 10 into the inside space 33 of the valve body 30, can be limited.

Third Embodiment

A third embodiment will be hereinafter described. The third embodiment is a modification of the first embodiment where the structure of the housing 10 and the structure of the valve body 30 are changed from those of the first embodiment. Since the rest of the structure of the third embodiment is the same as that of the first embodiment, there will be only described the differences that are different from the first embodiment.

Figure 6:
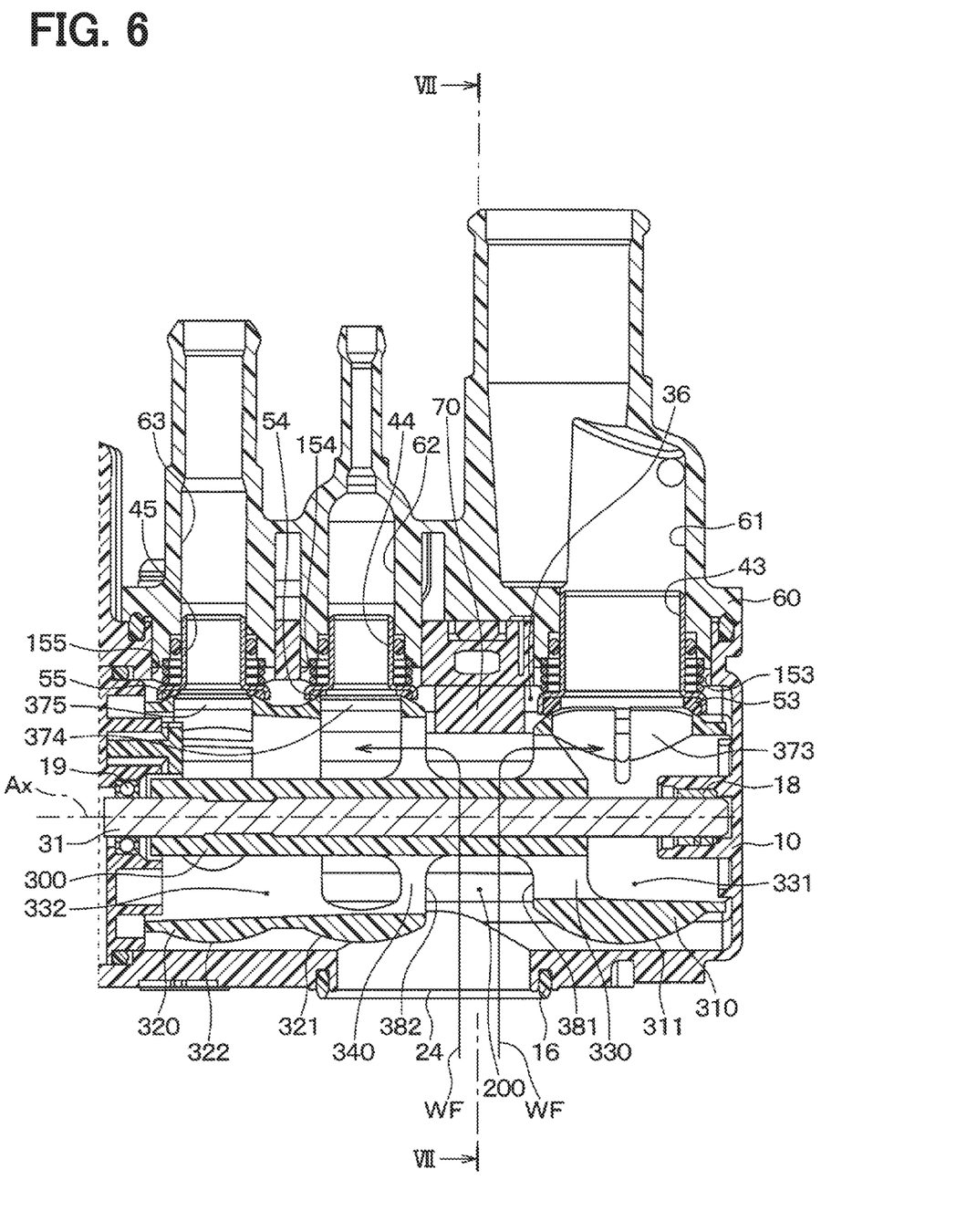
FIG. 6 is a cross-sectional view of a valve device according to a third embodiment.
Figure 7:
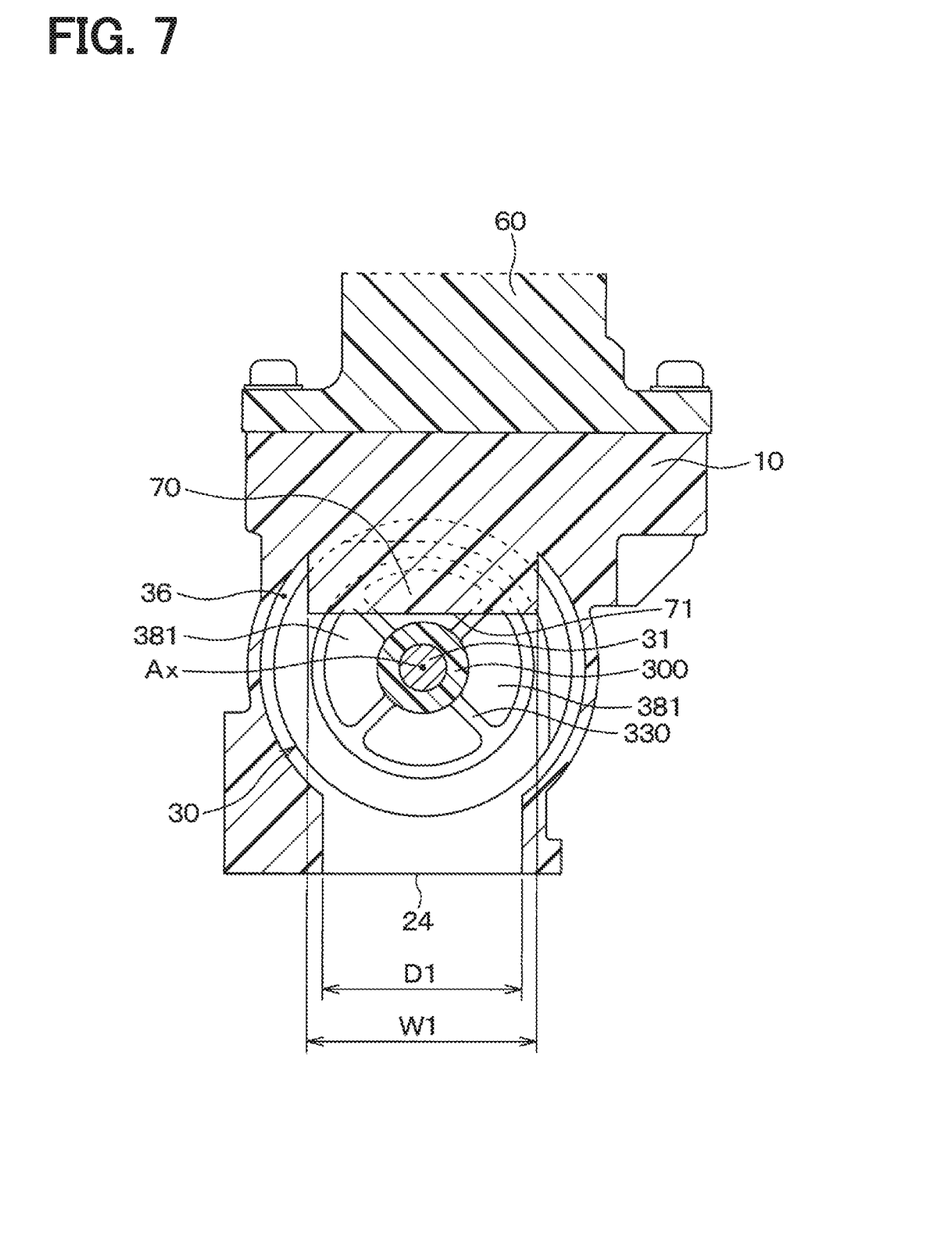
FIG. 7 is a cross-sectional view taken along line VII-VII in FIG. 6.

As shown in FIGS. 6 and 7, in the third embodiment, the fluid inlet 24 of the housing 10 is formed at a portion of the housing 10, which is positioned relative to a rotational axis Ax of the valve body 30 in a direction perpendicular to the rotational axis Ax of the valve body 30. The coolant, which is circulated in the coolant circuit, enters from the fluid inlet 24 into the inside of the housing 10. An O-ring 16 is placed at a portion of the housing 10 located at an outside of the fluid inlet 24.

The housing 10 includes the first bearing 18 and the second bearing 19, which support the shaft 31. The shaft 31 is rotatably supported at the inside of the housing 10 by the first bearing 18 and the second bearing 19.

The valve body 30 includes a shaft fixing portion 300, a first tubular portion 310, a second tubular portion 320, a plurality of primary connecting portions 330 and a plurality of secondary connecting portions 340. The shaft fixing portion 300 is fixed to the outer wall of the shaft 31. The first tubular portion 310 and the second tubular portion 320 are placed at a location that are spaced from the shaft fixing portion 300 in the radial direction. The first tubular portion 310 is placed at one side of the shaft 31 in the axial direction, and the second tubular portion 320 is placed at the other side of the shaft 31 in the axial direction. In the following description, one of two tubular portions located on the right side in FIG. 6 will be referred to as the first tubular portion 310, and the other one of the tubular portions located on the left side in FIG. 6 will be referred to as the second tubular portion 320. A predetermined gap 200 is formed between the first tubular portion 310 and the second tubular portion 320. The predetermined gap 200 is placed at a position that corresponds to the fluid inlet 24 of the housing 10. Specifically, the predetermined gap 200, which is located between the first tubular portion 310 and the second tubular portion 320, partially overlaps with the fluid inlet 24 of the housing 10 in a view taken in the direction that is perpendicular to the rotational axis Ax of the valve body 30.

A spherical surface 311 is formed at an outer wall of the first tubular portion 310. A first flow outlet 373, through which the coolant outflows, is formed at the spherical surface 311.

As shown in FIGS. 6 and 7, the primary connecting portions 330 are arranged one after another in a circumferential direction and radially extend between an end portion of the first tubular portion 310 located on the second tubular portion 320 side and the shaft fixing portion 300 to join between the first tubular portion 310 and the shaft fixing portion 300. A first flow inlet 381 is formed such that a corresponding portion of the first flow inlet 381 is formed between each adjacent two of the primary connecting portions 330. The first flow inlet 381 is a flow inlet, through which the coolant enters from the inside space of the housing 10 (specifically, the predetermined gap 200 between the first tubular portion 310 and the second tubular portion 320) into an inside space 331 of the first tubular portion 310 of the valve body 30.

Two spherical surfaces 321, 322 are formed at an outer wall of the second tubular portion 320 such that a center of a sphere of the spherical surface 321 is different from a center of a sphere of the spherical surface 322. Among the two spherical surfaces 321, 322 formed at the outer wall of the second tubular portion 320, a second flow outlet 374 is formed at the spherical surface 321, and a third flow outlet 375 is formed at the other spherical surface 322.

The secondary connecting portions 340 are arranged one after another in the circumferential direction and radially extend between an end portion of the second tubular portion 320 located on the first tubular portion 310 side and the shaft fixing portion 300 to join between the second tubular portion 320 and the shaft fixing portion 300. A second flow inlet 382 is formed such that a corresponding portion of the second flow inlet 382 is formed between each adjacent two of the secondary connecting portions 340. The second flow inlet 382 is a flow inlet, through which the coolant enters from the inside space of the housing 10 (specifically, the predetermined gap 200 between the first tubular portion 310 and the second tubular portion 320) into an inside space 332 of the second tubular portion 320 of the valve body 30. As described above, in the third embodiment, each of the first flow inlet 381 and the second flow inlet 382 of the valve body 30 is formed at the corresponding one of the portions of the valve body 30, which are arranged in the axial direction of the rotational axis Ax at the valve body 30.

First to third fluid outlets 153, 154, 155 are formed at corresponding portions of the housing 10, which correspond to the first to third flow outlets 373, 374, 375 of the valve body 30. Specifically, each of the first to third fluid outlets 153, 154, 155 of the housing 10 is positioned relative to the corresponding one of the first to third flow outlets 373, 374, 375 of the valve body 30 in a direction that is perpendicular to the rotational axis Ax of the valve body 30. The outlet pipe forming member 60 is installed to the first to third fluid outlets 153, 154, 155 of the housing 10. The outlet pipe forming member 60 has first to third fluid outlet holes 61, 62, 63 that are communicated with the first to third fluid outlets 153, 154, 155, respectively, of the housing 10.

A sleeve 43, 44, 45 and a seat member 53, 54, 55 are installed to each of the first to third fluid outlets 153, 154, 155 of the housing main body 11. Each of the sleeves 43, 44, 45 is slidably supported by an inner wall of a corresponding one of the fluid outlet holes 61, 62, 63 of the outlet pipe forming member 60.

The valve device 1 of the present embodiment includes a projection 70 that is located on an opposite side of the rotational axis Ax of the valve body 30, which is diametrically opposite to the fluid inlet 24 of the housing 10. The projection 70 projects from the inner wall of the housing 10 toward the rotational axis Ax of the valve body 30 beyond an outer peripheral portion of the valve body 30. The projection 70 is placed between the first flow inlet 381 of the first tubular portion 310 and the second flow inlet 382 of the second tubular portion 320 (i.e., in the predetermined gap 200 between the first tubular portion 310 and the second tubular portion 320). As shown in FIG. 7, the projection 70 has a width W1 that is measured in a direction perpendicular to the rotational axis Ax at a surface 71 of the projection 70 located on the radially inner side where the rotational axis Ax of the valve body 30 is placed. The width W1 of the projection 70 is set to be larger than the inner diameter D1 of the fluid inlet 24 of the housing 10. The projection 70 is configured to limit the coolant, which enters from the fluid inlet 24 of the housing 10 into the inside of the housing 10 (specifically, the predetermined gap 200 between the first tubular portion 310 and the second tubular portion 320), from directly flowing into the valve outside space 36.

Specifically, as indicated by arrows WF in FIG. 6, the coolant, which enters from the fluid inlet 24 of the housing 10 into the inside of the housing 10 (specifically, the predetermined gap 200 between the first tubular portion 310 and the second tubular portion 320) collides with the projection 70, so that a flow direction of the coolant is changed by the projection 70. The coolant, which collides with the projection 70, enters from the first flow inlet 381 of the valve body 30 into the inside space 331 of the first tubular portion 310 or enters from the second flow inlet 382 of the valve body 30 into the inside space 332 of the second tubular portion 320. Therefore, the coolant, which enters from the fluid inlet 24 of the housing 10 into the inside of the housing 10, collides with the projection 70 and is thereby limited from directly flowing into the valve outside space 36. Thus, the foreign object, which is mixed in the coolant that flows from the fluid inlet 24 of the housing 10 into the inside of the housing 10, is limited from intruding into the valve outside space 36. As a result, even in the valve device 1 of the third embodiment, the capturing of the foreign object between the outer wall of the valve body 30 and the seat member 53-55 is limited, and thereby an increase in the leakage of the coolant can be limited.

Fourth Embodiment

A fourth embodiment will be hereinafter described. The fourth embodiment is a modification of the third embodiment where a portion of the structure of the projection 70 is changed from that of the third embodiment. Since the rest of the structure of the fourth embodiment is the same as that of the third embodiment, there will be only described the differences that are different from the third embodiment.

Figure 8:
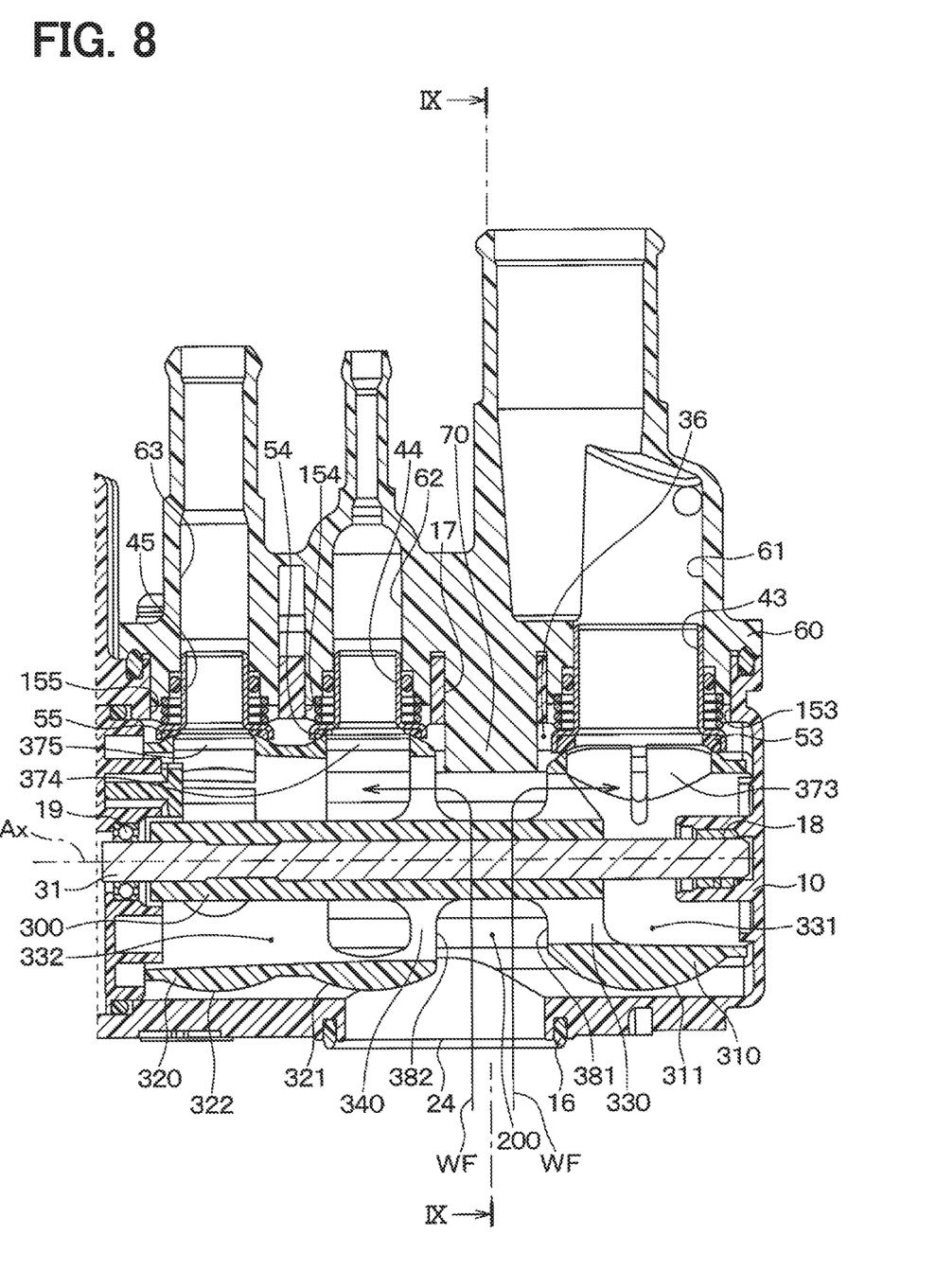
FIG. 8 is a cross-sectional view of a valve device according to a fourth embodiment.
Figure 9:
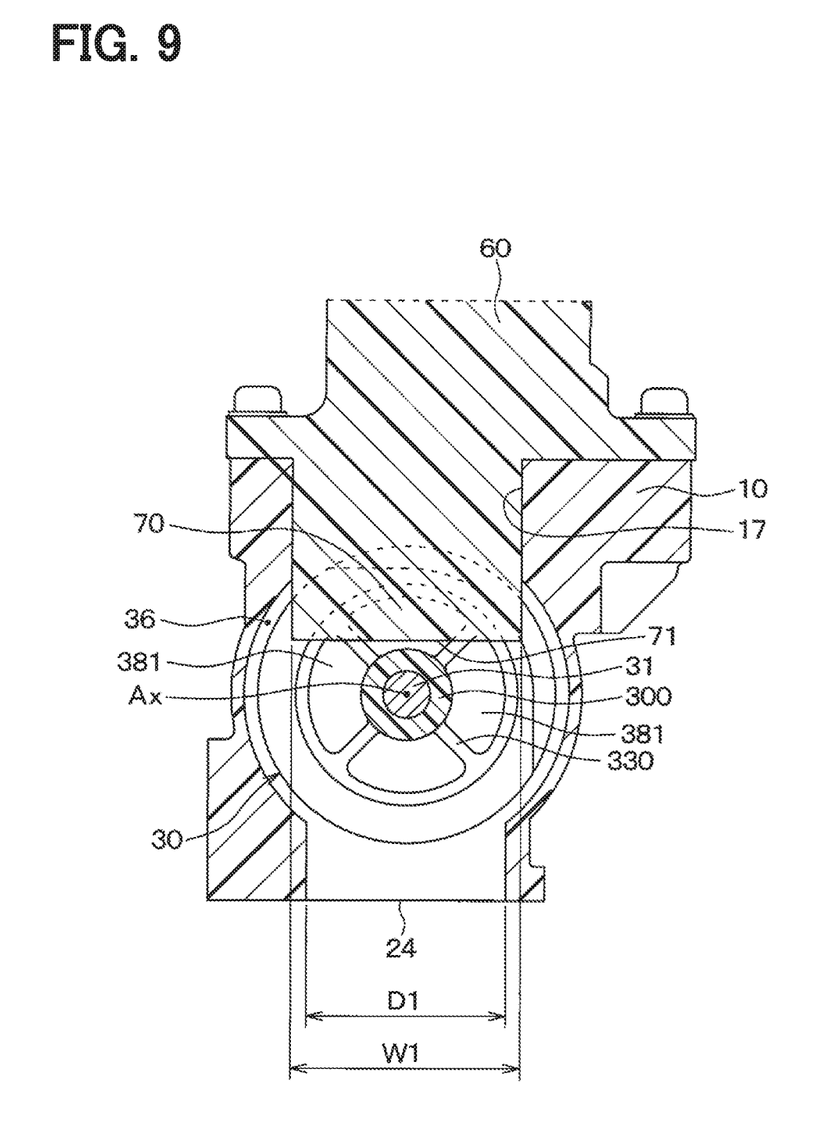
FIG. 9 is a cross-sectional view taken along line IX-IX in FIG. 8.

As shown in FIGS. 8 and 9, the valve device 1 of the fourth embodiment also includes the projection 70 that is located on the opposite side of the rotational axis Ax of the valve body 30, which is diametrically opposite to the fluid inlet 24 of the housing 10. The projection 70 is formed integrally with the outlet pipe forming member 60 in one piece. The housing 10 has a hole 17, into which the projection 70 is inserted. Therefore, the projection 70, which is formed at the outlet pipe forming member 60, extends through the hole 17 of the housing 10 and radially projects from the inner wall of the housing 10 beyond the outer peripheral portion of the valve body 30 toward the rotational axis Ax of the valve body 30. Like in the third embodiment, the projection 70 of the fourth embodiment is configured to limit the coolant, which enters from the fluid inlet 24 of the housing 10 into the inside of the housing 10, from directly flowing into the valve outside space 36. Therefore, even in the valve device 1 of the fourth embodiment, like the third embodiment, the capturing of the foreign object between the outer wall of the valve body 30 and the seat member 53-55 is limited, and thereby an increase in the leakage of the coolant can be limited.

Furthermore, in the fourth embodiment, the projection 70 is not formed at the inner wall of the housing 10. Therefore, when the housing 10 is formed by resin injection molding, the housing 10 can be easily removed from an injection mold that is provided for molding the housing 10.

Other Embodiments

The present disclosure should not be limited to the embodiments described above and may be appropriately modified within the scope of the present disclosure. In addition, the above embodiments are not irrelevant to each other and may be appropriately combined unless a combination is clearly not possible. In each of the above embodiments, it is needless to say that the elements constituting the embodiment are not necessarily essential, unless otherwise clearly indicated as essential or in principle considered to be clearly essential. In each of the above embodiments, when a value, such as a number, a numerical value, an amount, a range or the like of the constituent elements of the exemplary embodiment is mentioned, the present disclosure should not be limited to such a value unless it is clearly stated that it is essential and/or it is required in principle. In each of the above embodiments, for example, when referring to the shape of components and/or the positional relationship of the components, the present disclosure should not be limited to such a shape and positional relationship unless it is clearly stated that it is essential and/or it is required in principle.

(1) In each of the above embodiments, the valve device 1 is used in the coolant circuit of the engine. However, the application of the valve device 1 should not be limited to this. The valve device 1 of the present disclosure may be used in various circuits that circulate fluid such as oil or refrigerant.

(2) In each of the above embodiments, the valve device 1 has both the function of adjusting the flow rate of the coolant (serving as the fluid) and the function of changing the flow passage of the coolant. However, the function(s) of the valve device should not be limited to these functions. It is only required that the valve device 1 has at least one of the function of adjusting the flow rate of the fluid and the function of changing the flow passage of the fluid.

(3) In the above embodiments, there is described the valve device 1, in which the housing 10 has the plurality of fluid outlets 151-155, and the valve body 30 has the plurality of flow outlets 371-375. However, the present disclosure should not be limited to this structure. Specifically, the valve device 1 may be configured such that the housing 10 has a single fluid outlet, and the valve body 30 also has a single flow outlet.

(4) In the first and second embodiments, the flow inlet 38 side end portion 39 of the valve body 30 is in a planar form that is perpendicular to the rotational axis Ax of the valve body 30. However, the present disclosure should not be limited to this. The flow inlet 38 side end portion 39 of the valve body 30 may be tapered such that the inner diameter of the flow inlet 38 side end portion 39 of the valve body 30 is progressively reduced from the side, at which the fluid inlet 24 of the housing 10 is placed, toward the side, at which the bottom portion 34 of the valve body 30 is placed. Even with this construction, the fluid, which enters from the fluid inlet 24 of the housing 10, flows toward the inside space 33 of the valve body 30 and is limited from flowing toward the valve outside space 36.

(5) In the third and fourth embodiments, the projection 70 is formed only at the circumferential portion of the inner wall of the housing 10. However, the present disclosure should not be limited to this. The projection 70 may be formed along substantially the entire circumferential extent of the inner wall of the housing 10 except the portion of the inner wall of the housing 10, at which the fluid inlet 24 is formed.

What is claimed is:

1. A valve device configured to perform at least one of adjusting a flow rate of fluid and changing a flow passage of the fluid, comprising:
   a housing that has a fluid inlet, through which the fluid enters the housing, and a fluid outlet, through which the fluid exits from the housing;
   a valve body that is rotatably placed at an inside of the housing and has a flow inlet, which is formed at a location that corresponds to the fluid inlet, and a flow outlet, which is formed at a location that corresponds to the fluid outlet;
   a sleeve that is placed at the fluid outlet of the housing and forms a flow passage, into which the fluid is outputted from an inside space of the valve body through the flow outlet; and
   a seat member that is placed between an outer wall of the valve body and an end portion of the sleeve located on a side where the valve body is placed while the seat member slidably contacts the outer wall of the valve body, wherein:
   the valve device is configured such that the fluid, which enters from the fluid inlet of the housing into the inside of the housing, flows from the flow inlet of the valve body toward the inside space of the valve body and is limited from flowing into a space formed between an inner wall of the housing and the outer wall of the valve body;

the fluid inlet of the housing and the flow inlet of the valve body are both located at one side in an axial direction of a rotational axis of the valve body; and an inner diameter of the fluid inlet of the housing is smaller than an outer diameter of an end portion of the valve body located on a side where the flow inlet is placed.

2. The valve device according to claim 1, wherein the inner diameter of the fluid inlet of the housing is smaller than the outer diameter of the end portion of the valve body located on the side where the flow inlet is placed, and the inner diameter of the fluid inlet of the housing is larger than an inner diameter of the end portion of the valve body located on the side where the flow inlet is placed.

3. The valve device according to claim 1, wherein:

the fluid inlet of the housing and the flow inlet of the valve body are both located at one side in an axial direction of a rotational axis of the valve body; and an inner wall of the fluid inlet of the housing is shaped in a tapered form that has an inner diameter progressively reduced from an opposite side, which is opposite to the flow inlet, toward the flow inlet.

4. A valve device configured to perform at least one of adjusting a flow rate of fluid and changing a flow passage of the fluid, comprising:

a housing that has a fluid inlet, through which the fluid enters the housing, and a fluid outlet, through which the fluid exits from the housing;

a valve body that is rotatably placed at an inside of the housing and has a flow inlet, which is formed at a location that corresponds to the fluid inlet, and a flow outlet, which is formed at a location that corresponds to the fluid outlet;

a sleeve that is placed at the fluid outlet of the housing and forms a flow passage, into which the fluid is outputted from an inside space of the valve body through the flow outlet; and a seat member that is placed between an outer wall of the valve body and an end portion of the sleeve located on a side where the valve body is placed while the seat member slidably contacts the outer wall of the valve body, wherein:

the valve device is configured such that the fluid, which enters from the fluid inlet of the housing into the inside of the housing, flows from the flow inlet of the valve body toward the inside space of the valve body and is limited from flowing into a space formed between an inner wall of the housing and the outer wall of the valve body;

the fluid inlet of the housing is formed at a portion of the housing, which is positioned relative to a rotational axis of the valve body in a direction perpendicular to the rotational axis of the valve body;

the flow inlet of the valve body is formed at a portion of the valve body, which is placed in an axial direction of the rotational axis;

the valve device comprises a projection that is located on an opposite side of the rotational axis of the valve body, which is diametrically opposite to the fluid inlet, wherein the projection projects from the inner wall of the housing toward the rotational axis of the valve body beyond an outer peripheral portion of the valve body; and the projection is configured to limit the fluid, which enters from the fluid inlet of the housing into the inside of the housing, from flowing into the space formed between the inner wall of the housing and the outer wall of the valve body.

5. The valve device according to claim 4, comprising an outlet pipe forming member that is placed at an outside of the housing, wherein:

the projection extends from the outlet pipe forming member through a hole of the housing and projects from the inner wall of the housing toward the rotational axis of the valve body beyond the outer peripheral portion of the valve body.

6. A valve device configured to perform at least one of adjusting a flow rate of fluid and changing a flow passage of the fluid, comprising:

a housing that has a fluid inlet, through which the fluid enters the housing, and a fluid outlet, through which the fluid exits from the housing;

a valve body that is rotatably placed at an inside of the housing and has a flow inlet, which is formed at a location that corresponds to the fluid inlet, and a flow outlet, which is formed at a location that corresponds to the fluid outlet;

a sleeve that is placed at the fluid outlet of the housing and forms a flow passage, into which the fluid is outputted from an inside space of the valve body through the flow outlet; and a seat member that is placed between an outer wall of the valve body and an end portion of the sleeve located on a side where the valve body is placed while the seat member slidably contacts the outer wall of the valve body, wherein:

the valve device is configured such that the fluid, which enters from the fluid inlet of the housing into the inside of the housing, flows from the flow inlet of the valve body toward the inside space of the valve body and is limited from flowing into a space formed between an inner wall of the housing and the outer wall of the valve body;

the fluid inlet of the housing and the flow inlet of the valve body are both located at one side in an axial direction of a rotational axis of the valve body; and an inner wall of the fluid inlet of the housing is shaped in a tapered form that has an inner diameter progressively reduced from an opposite side, which is opposite to the flow inlet, toward the flow inlet.

* * * * *